United States Patent [19]

Cremer et al.

[11] 3,966,990

[45] June 29, 1976

[54] GRANULAR MODIFIED STARCH BINDER FOR DOUGH FORMING OF PUFFABLE FOOD PRODUCTS

[75] Inventors: Charles W. Cremer; James E. Eastman; Robert V. Schanefelt, all of Decatur, Ill.

[73] Assignee: A. E. Staley Manufacturing Company, Decatur, Ill.

[22] Filed: Feb. 11, 1974

[21] Appl. No.: 441,185

[52] U.S. Cl. ............................... 426/550; 426/549; 426/559; 426/241; 426/446; 426/496; 260/233.3 R
[51] Int. Cl.² .......................................... A23L 1/18
[58] Field of Search ........... 426/808, 446, 549, 550, 426/559, 560, 241, 496; 260/233.3

[56] References Cited
UNITED STATES PATENTS

| | | | |
|---|---|---|---|
| 3,027,258 | 3/1962 | Markakis et al. | 426/363 |
| 3,150,978 | 9/1964 | Campfield | 426/343 |
| 3,407,070 | 10/1968 | Murray et al. | 426/215 |
| 3,652,294 | 3/1972 | Marotta | 426/346 X |
| 3,666,511 | 5/1972 | Williams et al. | 426/141 X |

Primary Examiner—Raymond N. Jones
Attorney, Agent, or Firm—Howard J. Barnett; Charles J. Meyerson

[57] ABSTRACT

A dough binder for puffable food products comprising an alcohol washed, granular hydroxypropyl waxymaize based starch derivative obtained by the dry reaction of acid hydrolyzed waxy maize starch which has also been treated with anhydrous disodium phosphate and propylene oxide to a hydroxypropyl degree of substitution of 0.3 to 0.5. The granular, crude starch derivative is cold water swelling, and is alcohol washed and dried to 3–5 percent moisture.

Doughs made using the subject granular, ungelatinized starch derivative as a dough binder are more formable and workable, having the consistency of modeling clay. It is non-sticking, but readily cold-formable when used at about 30–70 percent of our starch derivative. 0–10 percent shortening, 0–30 percent other food materials, and 10–40 percent water. The dough mixture is then cold formed into the desired shapes and sizes, and may be baked or cooked at elevated temperatures (300°–475°F.) for about 3–10 minutes to produce a puffed food product having excellent texture and mouthfeel characteristics. The puffed food product may also be cooked in a microwave oven, or similar device, or it may be deep-fried at 350°–450°F.

11 Claims, No Drawings

GRANULAR MODIFIED STARCH BINDER FOR DOUGH FORMING OF PUFFABLE FOOD PRODUCTS

BACKGROUND

There is a steadily expanding trend towards simple and convenient food preparation using partially finished preblended ingredients. Speed of preparation is also considered a valuable feature in convenience foods. Another important consideration is consistent and uniform quality of the finished food product, even when there is a relatively long period between the time of preblending the ingredients in the partially finished food ("half product") and the product as consumed. As distribution chains become more complex, it is common for a half product to be made up at least 2–6 months prior to actual use. Uniform performance is critical to acquiring repeat purchase customers who ultimately determine whether a product will succeed.

The ease of blending and handling of the half product during the final product preparation steps is also a big factor in the final cost of the product. A half product is required which does not stick to the forming equipment, and which is easily formed into a desired product shape. A final preparation step time of less than twenty minutes is mandated by the customer's expectations. Another important selling point is the simplicity of the final preparation. Many users do not have the time or inclination to employ products which need added ingredients, or which require more than one simple preparation step with the least additional equipment. If a selection is possible between a half product which requires no added cooking oils and one which does, the product which only requires simple baking is usually chosen because of the ease of final preparation.

PRIOR ART

A large number of United States patents have been published which disclose some combination of some specific type of starch with other food ingredients to make a food product which is extruded or otherwise formed and then further heated to form a final product. It is not believed that any of these disclose the use of a granular, ungelatinized, cold-water swelling hydroxypropyl waxy maize starch derivative in a dough binder for puffable food products. All the combinations known to us to date require at least partial pregelatinization of the starch, sometimes with elaborate procedures for accomplishing this pregelling. We have discovered that the proposed pregelatinized combinations form sticky, gummy doughs which do not retain their shape well after forming, and which are difficult to form. Some of these proposed combinations have very limited shelf life, and some do not bake consistently well to crisp, puffable products with good mouthfeel.

The following patents are believed representative of the prior art. U.S. Pat. No. 3,027,258 issued Mar. 27, 1962 to Markakis et al., describes a chip-type food product prepared from a dough containing no less than 20 percent vital gluten, and 44–63 percent amylopectin. If waxy maize is the source of amylopectin, it should be either pregelatinized, or gelatinized before adding the vital gluten (see specification, col. 2, line 47 and col. 3, lines 8–15). The formed chips are dried to a moisture level below about 15 percent before final cooking.

A mixture of raw "corn flour," water and salt is disclosed in U.S. Pat. No. 3,150,978 issued Sept. 29, 1964 to Campfield. The named ingredients were mixed and blended in a Baker-Perkins Ko-Kneader at elevated temperatures so that the dough formed was gelatinized during the blending and forming. This gelatinized half product was then dried from 23 to 9 percent moisture and deep fat fried at 400°F. oil temperature to produce a final puffed product.

An amylose-containing food product for extrusion forming is described in U.S. Pat. No. 3,407,070 issued Oct. 22, 1968 to Murray et al. The shaping and heating of the preformed product is done under heat and pressure. The barrel of the extruder is heated to the range of 200°–350°F., which is "just enough to hydrate the amylose" (see specification, col. 4, lines 57–63). It is stated that the extruded product may be "enhanced" it its shape retaining properties by chilling it as it leaves the extruder, or by moving it through a channel of refrigerated air. The cold formed dough of our subject invention may be readily formed into dough-type half products without gelatinizing the modified starch binder, in contrast to Murray et al.'s gelatinization.

Another patent disclosure, U.S. Pat. No. 3,652,294 issued Mar. 28, 1972 to Marotta et al., is specifically limited to pregelatinized root and root-type starches, including waxy maize and waxy milo. The disclosure places a 3 percent by weight limit on the vital gluten in the composition because larger amounts are said to inhibit the desired puffing on baking. Our subject invention differs from this patent in that there is an essential requirement for the starch ingredients to be pregelatinized and thereafter shaped (see col. 4 of the patent).

SUMMARY

This invention provides a modified, granular starch dough binder which is especially useful in preforming bakeable half products which require only a single cooking step to produce a final, puffed crispy food product having good texture and mouthfeel. The preferred starch derivative is an acid thinned, waxy maize starch which has an alkali fluidity ranging from 17–61 ml, 2.5 g sample, 0.375N NaOH, and has a hydroxypropyl degree of substitution of from 0.3 to 0.5. About 30–70 percent by weight of the above granular modified starch derivative is blended with 0.5–10 percent shortening; 0–2 percent salt; 0–30 percent other food ingredients including meat, soy protein, dried cheese, sugar, corn syrup solids, powdered dry milk, dried whey, colorings, flavorings and emulsifiers; and 10–40 percent water. A dough mixture of excellent consistency is formed by blending the above ingredients at typical ambient temperatures of about 32°–100°F. without auxiliary heating to avoid gelatinizing the starch derivative. The dough is easily preformed into half products by cold extrusion, sheeting or other similar forming procedures. The half product can then be stored without deterioration for periods up to about 6 months prior to final baking, or it may be fried or baked immediately to produce a crispy, puffed product of good texture and mouthfeel characteristics. When the half product is to be stored, it is desirable to add about 0.1 percent by weight calcium propionate, or other similar perservative to retard spoilage, and the product should be suitably packaged to avoid contact with air. Refrigeration or freezing also insures half product freshness. The storage period can be extended up to and beyond 6 months when the half product is held in a frozen condition, and airtight packaging tends to extend the period for which the refrigerated half product may be stored.

There is no requirement that the half product be made up ahead of the time of use, and all the advantages of formability and dough consistency apply equally well even when the baking or cooking of the product takes place immediately after forming. The "half product" described here differs somewhat from the "half products" described heretofore in the snack food industry. The term has been used to refer to a shaped, gelatinized preformed product which has not yet been subjected to sufficient heat to cause the product to puff. "Half product" as used in the subject application refers to the shaped and cut dough pieces prior to any gelatinization step. By eliminating the pregelatinization step shown in the prior art, the granular starch derivative greatly improves the handling and forming properties of the dough used to make the half product.

The presently preferred base starch for the practice of this invention is waxy maize starch. It is contemplated that other "root-type" starches and root starches could be used as the base starch with some minor variations in derivatization to accomodate the specific and peculiar properties of a specific base starch. For example, potato starch is more difficult to hydroxypropylate, and possibly a higher level of hydroxypropyl substitution is needed to make the potato based starch derivative cold-water-swelling. It is also contemplated that a waxy rice base starch would not require as much acid-thinning to achieve the desired alkali fluidity levels because it has a much smaller average granule size.

The root-type starches are grouped as those which have pituitous, or glutinous pastes similar to the typical root starch pastes derived from potato and tapioca starches. Root-type starches, as used here, include waxy maize, waxy millet, waxy sorghum, waxy milo and waxy rice starches. These root-type starches are derived from distinct genetic varieties of the named cereals, and are grown under controlled conditions to avoid cross-pollination. These starches are mostly amylopectin, which is a branched chain glucose polymer. The designation "waxy" is derived from the glossy appearance of the grain kernel.

The root starches considered useful here include starches derived from yam, white and sweet potato, tapioca and arrow root. The cooking of any of these starches in water produces a paste that is clear and less viscous than cereal starch pastes at the same solids level, and which remain clear after cooling without gelling. The cooled pastes remain glutinous. Root and root-type starches are more freeze-thaw stable (cf. cornstarch).

The granules of the "cold-water-swelling" starch derivatives of this invention exhibit birefringence under a polarizing microscope. When water is added, the granules swell and lose their birefringence. This cold-water-swelling characteristic is believed to enhance uniform water absorption by the blended dough mixture.

EXAMPLE 1

Three thousand g. of waxy maize starch (dry substance basis) was slurried in sufficient water to make a 7,400 g. total weight slurry. Then 120 g. of 5N sulfuric acid was added to the slurry which was then divided into three separate samples. These samples were heated at 125°F. for 1, 3 and 6 hours, respectively. The alkali fluidities of the respective samples were 26 ml., 44 ml. and 61 ml., respectively (using 2.5 g. samples and following the test procedure described below). The three samples were adjusted to pH 5 with aqueous tribasic sodium phosphate, filtered, washed and dried. These samples had reduced viscosities of 1.75–3.0.*

(*Note: follows test procedure set forth in Kerr, Chemistry and Industry of Starch 2d ed. Reduced viscosity is specific viscosity divided by concentration, "C". C = 0.4% of starch in test sample, dry substance basis.)

Then 350 g. of each of the above acid-thinned starches was slurried with water at room temperature (about 70°–80°F.) to about 22°Be. (39.5 percent solids), salted with 5.25 g. of disodium phosphate, filtered and air dried without washing the filter cakes.

Three separate 300 g. samples, one of each of the above salted, acid thinned starches were then each dry reacted with 75 g. of propylene oxide in separate reaction chambers with agitation at 155°F. (68°C.) for 23 hours. The three crude, hydroxypropylated acid-thinned salted starch products were then each washed with 1,000 ml. of 85% aqueous ethanol containing 1% acetic acid, and then air dried, each of the three purified samples retaining its granular form throughout the above reaction procedure.

To test the above starch samples, each was used in a snack formula consisting of 60 percent by weight of the washed and dried starches, 18 percent by weight dried cheddar cheese, 2 percent salt, and 20 percent water. The ingredients were mixed and cold extruded through ⅛ inch dies. The extruded product was cut into ¼ inch lengths and baked at 400°F. for 5 minutes. All of the finished products had excellent puff and mouthfeel characteristics. The cold forming of the half products was simple, the formulas formed doughs having excellent consistency. The formed doughs were cohesive, retained the extruded shapes, and did not stick to the forming equipment.

The doughs had the consistency and workability of modeling clay, being moist, but not gummy or sticky to form and handle. It is believed that this superior handling property of these doughs is due to the granular nature of the starch derivatives used. The granular starch, although cold water swelling, effects more uniform dispersion of the 20 percent water throughout the dough. There is a more thorough and intimate mixing of the starch, water and other ingredients in the formula because the starch used is granular, as contrasted with the pregelatinized products of the prior art. In any event, the key to a superior dough forming material is the use of the granular starch derivative which has not been gelatinized.

EXAMPLE 2

A larger quantity of the starch derivative used in the practice of the invention was made as follows:

1. 75,000 lbs. waxy maize starch was first slurried to about 19°Be. (at 100°F.), heated to 118°–122°F. and then acid-thinned by adding about 113 lbs. of 60°Be. $H_2SO_4$. Using the test procedure for determining alkali fluidity as set forth below, the acid-thinning was carried to a target value of 37 ml. (2 g. d.s., 0.375N). An alkali fluidity in the range of 32–42 ml. is considered acceptable. When a 2.5 g d.s., 0.375 N acid-thinned starch sample is used, the preferred alkali fluidity is about 17–27 ml.

2. About 2,625 lbs. of anhydrous disodium phosphate was added to 75,000 lbs. (d.s.b.) starch, and the slurry was stirred for about one hour after all the phosphate had been added. The slurry pH was then adjusted to 7.0–8.5 with 30°Be. $H_2SO_4$ or 2% NaOH as required. The slurry was then diluted to 19°–20°Be. at 120°F. with water added as necessary, filtered without washing and then dried to about 7–8 percent moisture. The filtered dry starch should have about 1.0–1.8 percent by weight disodium phosphate, dry substance basis (d.s.b.).

3. About 6,000 lbs. of the above acid-thinned phosphate treated waxy maize starch was then placed in a reactor vessel and heated to about 175°F. while sealing and evacuating the reactor chamber to about 7 psia. The reactor vessel was then purged with nitrogen as pressure was increased to 35 psia. The reactor was then again evacuated to 7 psia and propylene oxide added as a liquid through a spray nozzle at a rate sufficient to maintain a reactor pressure of 50 psia. Reaction temperature is maintained at about 175°F. After 1,000 lbs. of propylene oxide has been added (18.2 percent on d.s. wt. of starch) the pressure is reduced to 25 psia.

4. After about 9 hrs. total reaction time and when a maximum of about 25 lbs. propylene oxide 100 lbs. d.s. starch has been added (no more than 1,380 lbs. propylene oxide per 6,000 lbs. of starting starch at 8 percent moisture), the reaction chamber was purged by 5 evacuations to 15 psia, and 4 pressurizations with nitrogen to 45 psia, while simultaneously cooling the reaction mixture.

5. The crude, acid-thinned hydroxypropylated waxy maize starch as prepared above was then alcohol washed as follows:
    a. About 2,400 lbs. of the above crude product was stirred into an extractor which had first been purged with nitrogen, and to which 700 gal. of alcohol had already been added.
    b. The resultant slurry was adjusted to 4.5–5.5 pH with 60°Be. $H_2SO_4$ (about 1,500–2,000 ml. required), and the slurry was pumped into a filter feed tank (purged first with $N_2$) and the slurry was filtered in a rotary pressure filter.
    c. The filter cake was then washed with alcohol at the rate of 1 lb. of alcohol per 1 lb. starch (dry substance).
    d. The filter cake was purged then with nitrogen, dried to 3–5 percent moisture, and screened through 100 mesh screen.

The above product has retained its granular structure throughout all of the above processing steps, and when used to form a dough, according to the recipe set forth above, it is maintained in a granular, partially swollen condition, because it has a certain amount of cold water solubility, due to the above chemical processing steps. It is the ungelatinized, granular nature of this starch that contributes to the excellent dough forming chracteristics. Although the modified starch granules swell, and start to lose their birefringence as water is added in mixing the dough, the starch granules do retain their granular character, and this is believed to aid greatly in establishing the desired clay-like consistency of the dough.

PUFFING TEST PROCEDURE FOR BAKED PRODUCT

This test was developed in order to obtain some objective measurement of the performance of the product upon baking. The subjective measurement of crispness can also be observed. The formula used is simple, and allows evaluation of the product with a minimum of variables. The crispness of the baked product is important, and is observed and recorded also, for the tested samples. A puffed product having a minimum specific volume of at least 5.5 is considered acceptable.

Puffing Test for Baked Snacks:

| Formula: | |
|---|---|
| Starch | 120 g. d.s.b. |
| Salt | 4 g. |
| Cheesetang | 36 g. |
| Water | 58 g. |

Procedure:

1. Place dry blend in 4 quart mixer bowl with paddle.
2. Place mixer on speed No. 2 and start water addition.
3. Add water slowly over 2 minute period.
4. Mix an additional 1 minute on speed No. 3.
5. Extrude blended material through Hobart meat chopper with ⅛ inch plate and no blade.
6. Cut extruded material into ¼ inch long pieces with scissors.
7. Place pieces on pie tin 1 inch apart and bake 4.5 minutes at 400°F.

Specific Volume Measurement:
1. Fill 600 ml. tall form beaker with rapeseed. Tap beaker lightly with spatula and level off rapeseed using spatula.
2. Discard excess rapeseed and empty the contents of the 600 ml. beaker into a 1,000 ml. beaker.
3. Weigh 10 gms. of baked snacks into the 600 ml. beaker.
4. Pour rapeseed from 1,000 ml. beaker into the 600 ml. beaker containing the weighed sample of snacks.
5. Tap beaker lightly with spatula and level off rapeseed using spatula.
6. Pour excess rapeseed into a 100 ml. graduated cylinder.
7. Tap cylinder lightly with spatula and read volume of rapeseed in cc.
8. Calculate specific volume by:

$$SV = \frac{\text{Volume in cc}}{\text{sample wt.}} = \text{cc/gm}.$$

ALKALI FLUIDITY TEST PROCEDURE

Adjust slurry sample to 4.5–5.0 pH with sodium carbonate. Filter 200 ml. of slurry on Buchner funnel using 18.5 cm. Whatman No. 2 filter paper and wash cake with three 200 ml. portions of tap water at 78°–82°F. Crumble cake through a U.S. No. 10 screen and place in 8 oz. jar and tighten the cap. Determine moisture content of Cenco Moisture Balance set at 110 and using a 125 watt lamp. Heat for 20 minutes and read moisture content. Calculate the quantity of cake which contains 2.0 g. d.s. starch and weigh this quantity of cake into a fluidity beaker. Add 8 ml. tap water to the fluidity beaker and slurry starch and water by gently swirling the fluidity beaker. Add 90 ml. of 0.375N NaOH fluidity solution at 77°F. and stir for exactly 3 minutes with fluidity stirrer. Immediately determine fluidity with a previously standardized fluidity funnel. Caution: Room temperature must be 74°–80°F. for an accurate fluidity. The sample size used will vary, depending on the observed viscosity of the starch. For example, a 2.5 g. sample of the starch (dry substance) was used in Example I above. As a general rule, the "thinner" the starch, the larger the sample size. A "midscale" alkali fluidity reading is sought for greatest accuracy.

The alkali fluidity test procedure is generally set forth in U.S. Pat. No. 3,238,193 at columns 7 and 8, lines 40–61 and 1–9, respectively. The fluidity funnel employed for the test has a specific "water time" between about 30 to 40 seconds. The water time of the funnel is checked at the beginning of each test by running 100 ml. of pure water through the funnel and recording the total elapsed time. This total elapsed time is used for each sample of alkali-treated starch slurry to be tested. The alkali fluidity is the total amount of the starch sample in ml. which passes through the funnel in the observed water time as determined above.

The alkali fluidity funnel used for the alkali fluidity tests described herein comprises two main parts, a funnel body and a funnel tip threadably attached thereto. A simple plunger-type, tapered valve on a glass stem can be used to manually control flow through the funnel orifice. The funnel parts are precision-machined from stainless steel stock, and polished to very smooth surfaces on all parts which come in contact with the test samples.

The funnel body defines a generally cone shaped vessel having a sixty degree angle (or taper) between opposite, converging funnel walls. Funnel body height is sufficient to hold at least a 100 ml. sample, and a 0.277 inch orifice and fluid passage is provided at the narrowest portion of the funnel for attachment to the funnel tip. The fluid passage is 1½ inches in length from the orifice to the narrow end of the funnel body. The opposite, wide orifice of the funnel body is oriented upwardly, and the tapered valve is inserted downwardly from above into the smaller orifice during the tests. Operation of this valve against the water-time of the funnel gives the test readings. The funnel tip is a cup shaped member, which is threadably received on the narrow end of the funnel body. The internal chamber of the funnel tip is hemispherical and has a 3/16 inch diameter with a lower central opening of 0.070 inch which is 0.0492 inches in length. The total height for the lower end of the funnel body passage to the lower external orifice of the funnel tip includes the height of the ball chamber (0.1008 inches) and the length (0.0492 inches) of the funnel tip opening.

The composite apparatus described above is vertically disposed above a graduated cylinder for the actual tests. At the beginning of each test, the water-time for the apparatus is checked by running 100 ml. of pure water through the funnel and recording the total elapsed time. The water-time then becomes the time against which each sample is tested.

As set forth above in the examples, the alkali fluidity test is used to monitor the acid conversion step of the process. When the target alkali fluidity is reached, the acid conversion step is stopped. The alkali fluidity is then corrected to 77°F. using a chart based on actual experience.

A second measurement of the thinning effect was also recorded in connection with the Example 1 samples. This was the "Specific Viscosity Test" described in Kerr. Chemistry and Industry of Starch, 2d ed., Academic Press N.Y. (1950), page 675. The reduced viscosity readings for satisfactory levels of thinning as observed in Example 1 ranged about 1.75 to 3.0. The test procedure set forth in Kerr is followed to obtain specific viscosity. Reduced viscosity is specific viscosity divided by concentration, "C" which, in our case, was 0.4 percent by weight dsb of the starch in water.

Dry dextrinization or oxidative thinning can be used instead. Drying to 3–5 percent is to remove all volatile residues, and moisture level in starch can thereafter range from 3–14 percent with no adverse effects.

We claim:

1. A dough for puffable food products including a dough binder comprising an alcohol washed, granular hydroxypropyl starch derivative obtained from hydrolyzed starch selected from the group consisting of waxy maize, waxy milo, waxy sorghum, waxy rice, waxy millet, potato, tapioca and arrowroot starch, said starch having an alkali fluidity in the range of 17–61 ml. for a 2.5 g. sample tested in .375N sodium hydroxide, said starch having been first treated with anhydrous disodium phosphate and then reacted with propylene oxide to a hydroxypropyl degree of substitution of 0.3 to 0.5, alcohol washed, and then dried to about 3–5 percent moisture to remove volatile residues, said binder comprising 30–70 percent by weight of said dough.

2. The dough of claim 1, in which the starch is waxy maize which has been first acid hydrolyzed.

3. A dough of superior cold formability for puffable food products comprising:
   a. 30–70 percent by weight of the ungelatinized starch dough binder of claim 1;
   b. up to 10 percent shortening;
   c. up to 30 percent other food materials; and
   d. 10–40 percent water.

4. An ungelatinized, dough half product formed from the dough of claim 3 by cold-forming methods including cold extrusion and cold sheeting.

5. A puffed food product of excellent texture and mouthfeel obtained by heating the half product of claim 4 at about 300°–475°F. for about 3–10 minutes, said heating being accomplished by one or more methods including baking, deep frying or microwave heating, or combinations of these heating methods.

6. A process for making a puffable food half product, the steps comprising:
   1. first mixing 30 to 70 percent by weight, dry substance basis, of a cold-water-swelling, granular, ungelatinized starch derivative with 10 to 40 percent by weight water and up to 30 percent of additional food ingredients, to form a non-gummy, cold-formable dough having a clay-like consistency, said starch derivative being selected from the group consisting of root and root-type starches, and having been first thinned to an alkali fluidity of about 17–61 ml. for a 2.5 g. sample, 0.375N NaOH; said starch derivative having been then reacted with propylene oxide to a hydroxypropyl degree of substitution from 0.3 to 0.5; then alcohol washed and dried to a moisture level of about 3-5% based on the weight of the starch; and 2. then preshaping said dough into a shape retaining non-gelatinized half product by cold forming methods including cold extrusion and cold sheeting.

7. The process of claim 6, in which the cold-water-swelling, granular, ungelatinized starch derivative is waxy maize starch.

8. The half product prepared by the process of claim 6.

9. A finished puffed food product prepared from the half product made by the process of claim 6 by applying thermal energy to said half product sufficient to cook and expand the half product to a finished food product having a light crispy texture, said expanded, finished product having increased to a specific volume at least 5.5 greater than the half product calculated by the formula:

$$SV = \frac{\text{Volume in cc}}{\text{sample wt.}} = cc/gm.$$

on a finished product made from a ⅛inch diameter, ¼inch long, cold formed half product sample baked 4.5 minutes at 400°f.

10. The half product resulting from the process of claim 7.

11. A finished puffed food product resulting from the process of claim 6, in which the starch derivative is waxy maize starch, and the finished puffed food product is obtained by applying thermal energy to said half product sufficient to cook and expand the half product to a finished food product having a light crispy texture, said expanded, finished product having increased to a specific volume at least 5.5 greater than the half product.

* * * * *